United States Patent Office 3,546,287
Patented Dec. 8, 1970

---

3,546,287
SYNTHESIS OF 1,2,3,4 - TETRAHYDRO - 5 - NAPHTHALENE SULFONYLFLUORIDE (I) AND 1,2,3,4-TETRAHYDRO - 6 - NAPTHALENE SULFONYLFLUORIDE
Ronald D. Bushick, Glen Mills, Pa., assignor to Sun Oil Company, Philadelphia, Pa., a corporation of New Jersey
No Drawing. Filed Jan. 24, 1966, Ser. No. 522,391
Int. Cl. C07c *143/00*
U.S. Cl. 260—543                                             4 Claims

ABSTRACT OF THE DISCLOSURE

A method of producing a mixture of isomers of 1,2,3,4-tetrahydro naphthalene sulfonylfluoride which comprises contacting 1,2,3,4-tetrahydro naphthalene with $BF_3$ and an excess of fluorosulfonic acid for a time of from 15 minutes to 3 hours at a temperature of from —5 to 160° C.

---

This invention relates to new compositions of aromatic sulfonylfluorides and processes for their preparation. More specifically, this invention involves a method for the preparation of 1,2,3,4-tetrahydro naphthalene sulfonylfluorides from tetrahydro naphthalene.

The aromatic sulfonylfluorides are of growing importance in replacing the sulfonylchlorides for use in the preparation of sulfonamides. The sulfonylfluorides are not as reactive as the corresponding chlorides but are much more stable and are further resistant to hydrolysis. This latter characteristic makes the fluorides less demanding in care during their preparation or storage. The fluorides also possess other valuable properties such as ease of concentration or purification by distillation.

These aromatic sulfonylfluorides are made by a variety of known methods such as reaction between an aryl sulfonylchloride and a fluorinating agent capable of replacing the chlorine. Such agents include aqueous sodium or potassium fluoride. Another method of preparation which is useful because of the great latitude in selecting the aromatic reactant is the reaction between fluorosulfonic acid and the corresponding parent aromatic compound, aromatic sulfonic acid or aromatic sulfonylchloride compound. For example, 1,2,3,4-tetrahydro-5-naphthalene sulfonylfluoride (I) has been prepared by contacting tetrahydro naphthalene with fluosulfonic acid at —5° C. to 160° C. for a period of twelve hours.

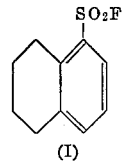

(I)

It has now been found that 1,2,3,4-tetrahydro naphthalene sulfonylfluoride may be prepared by contacting 1,2,3,4-tetrahydro naphthalene with fluosulfonic acid or fluosulfonic acid and $BF_3$ for reaction times much shorter than before observed. The shorter reaction times surprisingly result in increased yields and give a mixture of two isomers of 1,2,3,4-tetrahydro naphthalene sulfonylfluoride. Compositions comprising both 1,2,3,4-tetrahydro-5-naphthalene sulfonylfluoride (I) and 1,2,3,4-tetrahydro-6-naphthalene sulfonylfluoride (II) can be prepared by this process.

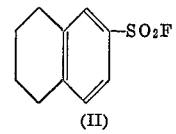

(II)

Specifically this process comprises contacting the tetrahydro naphthalene with fluosulfonic acid or fluosulfonic acid and $BF_3$ at a temperature of from —5° C. to 160° C. for a period of from 15 minutes to 3 hours. The preferred temperature range is about 4° C. to about 75° C. The fluosulfonic acid should be used in an amount in excess of that which would stoichiometrically be required. Preferably the excess is of the order of 3 to 6 moles of acid per mole of tetrahydro naphthalene, but more or less of the excess acid is suitable. The reactants may be cooled in Dry Ice or acetone- Dry Ice prior to contact to insure less violent reaction.

The invention is illustrated by the following examples. These examples are merely illustrative of the invention; there is no intention of being limited by any specific details thereof, since variations may be made as indicated in the above description.

TABLE I

| Example: | (1) $HSO_3F$, moles | (2) $BF_3$, moles | (3) temp., °C. | Product composition (wt. percent, VPC [1]) | | | Cpd. I/ Cpd. II |
|---|---|---|---|---|---|---|---|
| | | | | (4) Cpd. I | (5) Cpd. II | (6) Other | |
| 1 | 0.35 | 0.65 | 4 | 24.2 | 73.4 | 1.5 | 0.33 |
| 2 | 0.59 | 0.68 | 50 | 46.8 | 50.1 | 3.1 | 0.93 |
| 3 | 0.34 | 0.65 | 50 | 44.4 | 55.6 | ([2]) | 0.80 |
| 4 | 0.51 | 0.68 | 75 | 41.4 | 50.0 | 8.6 | 0.83 |
| 5 | 0.33 | 0.38 | 50 | 46.0 | 54.0 | ([2]) | 0.85 |
| 6 | 0.50 | | 50 | 46.2 | 50.8 | 3.0 | 0.91 |

[1] Vapor Phase Chromatography.
[2] Trace.

In each example, about 0.10 mole of tetrahydro naphthalene was cooled in Dry Ice and then charged into a 75 ml. Hokebomb pressure vessel. To this was added the indicated moles of precooled fluosulfonic acid or fluosulfonic acid and $BF_3$. The temperature of the vessel was maintained as indicated in Column 3, Table I, and in all of the runs the reaction time was 90 minutes. At the end of the reaction the contents of the vessel were poured over ice and extracted with pentane.

Compound I of Table I is 1,2,3,4-tetrahydro-5-naphthalene sulfonylfluoride and Compound II is 1,2,3,4- tetrahydro-6-naphthalene sulfonylfluoride. "Other" indicates unidentified products. Columns 4, 5 and 6 show a complete conversion of tetrahydro naphthalene to Compounds I, II and unidentified products.

Each example resulted in a composition comprising about 20% to 50% by weight of Compound I and 50% to 80% of Compound II. The 1,2,3,4-tetrahydro-5-naphthalene sulfonylfluoride was recovered as a white solid with a melting point of about 70° C. while the 1,2,3,4-tetrahydro-6-naphthalene sulfonylfluoride was a white solid with a melting range of 39 to 40° C.

The characterization of these products was based on spectroscopic methods as well as on elemental analysis. The infrared spectra of the products showed absorption bands characteristic of the —$SO_3F$ group. The low voltage mass spectrometry gave a mass of 214 for each isomer. The elemental analysis of a 4 mg. sample also supported the structures (Table II).

TABLE II

|  | Carbon, percent | Hydrogen, percent |
|---|---|---|
| Found | 57.06 | 5.27 |
| Calculated | 56.10 | 5.14 |

All types of protons that could be predicted for structures (I) and (II) were accounted for by nuclear magnetic resonance.

Both isomers of the 1,2,3,4-tetrahydro naphthalene sulfonylfluorides have the same uses as other sulfonylfluorides known in the art. The most common use is as an intermediate for the preparation of organic sulfonamides by reaction with concentrated aqueous ammonia. The resulting sulfonamides are used as wetting agents, plasticizers, and synthetic resins applicable as adhesives, stiffening agents and varnishes. The sulfonamides may also be used as intermediates in the manufacture of germicidal, insecticidal, fungicidal, sanitizing and bleaching agents and of other useful derivatives. Other uses of the organic sulfonamides include lubricants in metal forming, shaping and other machine operations.

What is claimed is:

1. A method of producing a mixture of isomers of 1,2,3,4-tetrahydro naphthalene sulfonylfluoride which comprises contacting 1,2,3,4-tetrahydro naphthalene with $BF_3$ and an excess of fluorosulfonic acid for a time of from 15 minutes to 3 hours at a temperature of from —5 to 160° C.

2. The method of claim 1 in which the reaction temperature is maintained at from about 4° C. to about 75° C.

3. The method of claim 1 in which the excess of fluosulfonic acid is between 3 to 6 moles per mole of 1,2,3,4-tetrahydro naphthalene.

4. The method of claim 3 in which the reaction time is about 90 minutes.

References Cited

UNITED STATES PATENTS 2,686,202   8/1954   McCoy et al. _____ 260—543F

DANIEL D. HORWITZ, Primary Examiner

U.S. Cl. X.R.

252—433